(12) United States Patent
Harken et al.

(10) Patent No.: US 7,590,425 B2
(45) Date of Patent: Sep. 15, 2009

(54) DATA COLLECTION DEVICE THAT CONFIGURES ITSELF BASED ON GEOGRAPHIC POSITION DATA

(75) Inventors: Dean Russel Harken, North Liberty, IA (US); Lyle L. Zumbach, Marion, IA (US)

(73) Assignee: Intermec IP Corp., Everett, WA (US)

( * ) Notice: Subject to any disclaimer, the term of this patent is extended or adjusted under 35 U.S.C. 154(b) by 599 days.

(21) Appl. No.: 11/194,837

(22) Filed: Aug. 1, 2005

(65) Prior Publication Data

US 2006/0030338 A1 Feb. 9, 2006

Related U.S. Application Data

(60) Provisional application No. 60/599,110, filed on Aug. 5, 2004.

(51) Int. Cl.
*H04W 24/00* (2009.01)
*H04M 1/66* (2006.01)

(52) U.S. Cl. ............... 455/456.1; 455/456.3; 455/410; 455/418

(58) Field of Classification Search ............ 455/456.1, 455/456.3, 456.4, 456.6, 522, 410, 418
See application file for complete search history.

(56) References Cited

U.S. PATENT DOCUMENTS

| 7,050,907 | B1 * | 5/2006 | Janky et al. ............... 701/213 |
| 2004/0054816 | A1 * | 3/2004 | Carapelli ................. 710/1 |
| 2004/0077341 | A1 * | 4/2004 | Chandranmenon et al. .. 455/418 |

* cited by examiner

*Primary Examiner*—Barry W Taylor
(74) *Attorney, Agent, or Firm*—Kinney & Lange, P.A.

(57) ABSTRACT

A computing device that includes at least one input/output device automatically configures itself based on acquired data the represents a geographic position of the computing device. The computing device acquires environment identification data and performs at least one of a configuration command and a power state command on the input/output device based on the acquired environment identification data.

13 Claims, 1 Drawing Sheet

DATA COLLECTION DEVICE THAT CONFIGURES ITSELF BASED ON GEOGRAPHIC POSITION DATA

CROSS REFERENCE TO RELATED APPLICATION(S)

This application claims the benefit of Provisional Application No. 60/599,110 filed Aug. 8, 2004 for "Data Collection Device That Configures Itself Based On Geographic Position Data" by D. Harken and L. Zumbach.

INCORPORATION BY REFERENCE

The aforementioned Provisional Application No. 60/599,110 is hereby incorporated by reference in its entirety.

BACKGROUND OF THE INVENTION

The present invention relates to a data collection device that performs self-configuration based on geographic position data.

Data collection devices have long been popular tools for gathering and storing information in electronic form. The number of features supported in these devices has continued to expand, providing more and more capabilities for a diverse range of applications. User interfaces provided on the data collection devices have also become more advanced, to allow access to all of the supported features.

The number of features available for a data collection device, as well as the appropriate use of those features, often depends on the environment in which the device is being used. The responsibility for configuring the device to utilize the proper set of features and for operating the device accordingly typically falls on the user of the device, thus requiring a certain amount of time, skill and training on the part of the user. This necessity can be inefficient, and can lead to configuration or operation errors due to unavoidable human mistakes made by the user.

It would be useful in the art to provide automatic configuration capability for a data collection device.

SUMMARY OF THE INVENTION

The present invention is a computing device that includes at least one input/output device and automatically configures itself based on acquired data the represents a geographic position of the computing device. The computing device acquires environment identification data and performs at least one of a configuration command and a power state command on the input/output device based on the acquired environment identification data.

DETAILED DESCRIPTION

Figure 1:
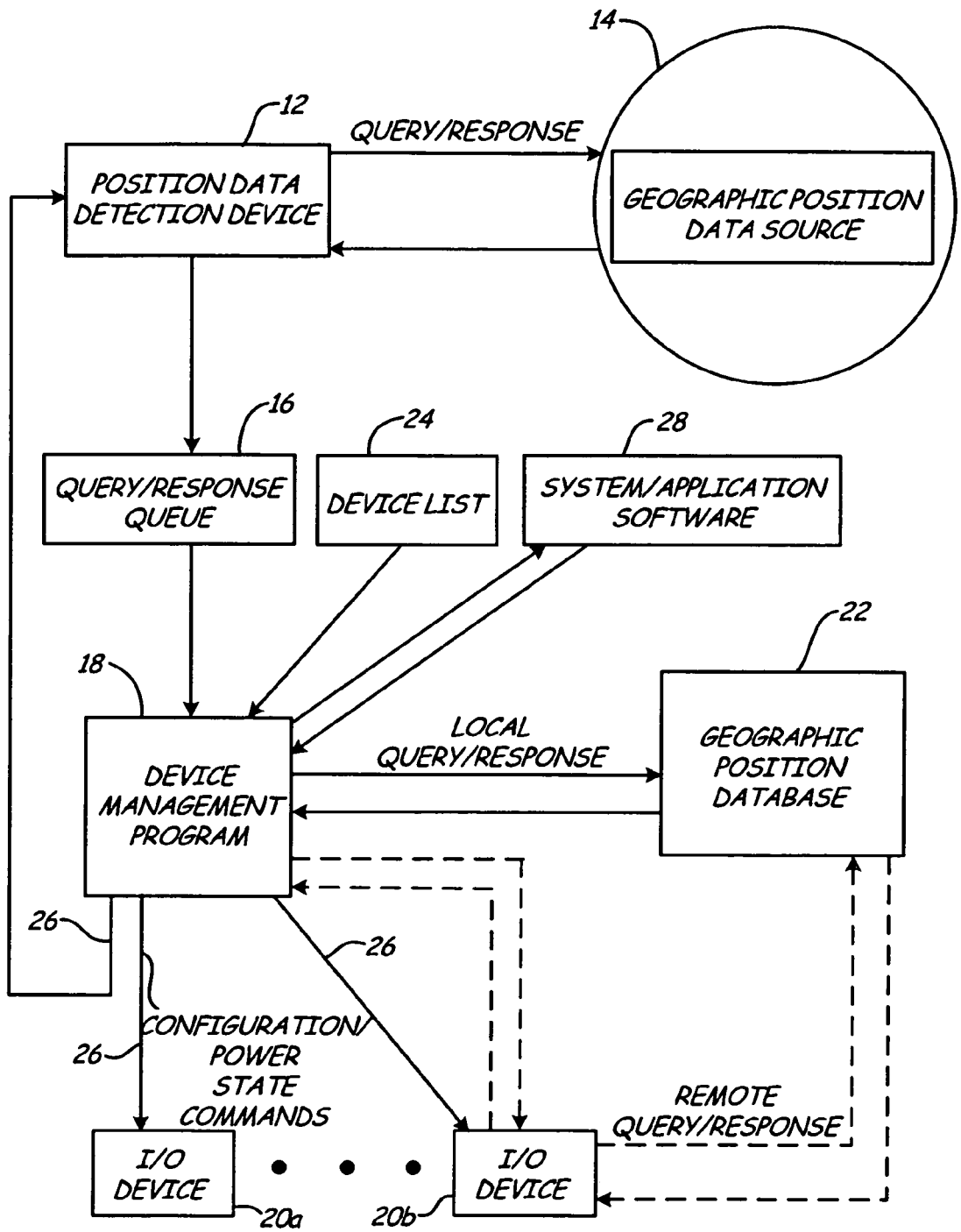
FIG. 1 is a block diagram illustrating the functions of a data collection device having the ability to configure itself based on geographic position data.

FIG. 1 is a block diagram illustrating the functions of a data collection device having the ability to configure itself based on geographic position data. The data collection device includes position data detection device 12, which may be a GPS receiver, Bluetooth radio, bar code scanner, or some other type of device. Position data detection device 12 communicates with geographic position data source 14, which may take any of a number of forms, to acquire data that identifies the environment in which the data collection device is operating. This acquisition of data may follow a query/response type of protocol in an exemplary embodiment. The acquired geographic position data is buffered by query/response queue 16, and is then input to device management program 18. Device management program 18 is typically implemented in software or firmware of the data collection device, and serves as the central configuration facility for input/output devices of the device, such as I/O devices 20a and 20b shown in FIG. 1.

Device management program 18 receives multiple types of stored information in order to properly configure I/O devices 20a and 20b. Geographic position database 22 contains policy information from which device configuration instructions can be determined, the policy information being associated with geographic ranges or boundaries. Device list 24 contains a list of I/O devices and configurable device settings that can be managed based on geographic position. Geographic position database 22 may be stored in a memory local to the data collection device, or may be remotely located on another computer. Communication with geographic position database 22 when it is located remotely from the data collection device may be effected in a number of ways, including by operation of an I/O device (such as I/O device 20b shown in FIG. 1) that is configurable by device management program 18.

In an exemplary operation of the data collection device, position data detection device 12 sends queries to geographic position data source 14 and receives responses to those queries that include data representing the geographic position of the data collection device. Device management program 18 receives the position data and compares that data to information in geographic position database 22 in order to determine appropriate configuration instructions for I/O devices 20a and 20b based on policy information provided by geographic position database 22 corresponding to the current geographic location of the data collection device. In an exemplary embodiment, the policy information stored in geographic position database 22 is a rule that defines the desired state of configuration for an I/O device without specifically stating the commands needed to achieve that state, so that the policy information can be applied to many different types of I/O devices. Alternatively, specific commands may be stored in geographic position database 22. Configuration and/or power state commands 26 are then performed on I/O devices 20a and 20b based on the geographic location, and in one embodiment these commands are also transmitted back to position data detection device 12 as a feedback mechanism. In some embodiments, system/application software 28 running on the device may also perform actions that are driven by geographic position data received from device management program 18.

Configuration and/or power state commands 26, which are based on the geographic location of the data collection device, may take a number of forms. I/O devices 20a and 20b may be selectively turned on or off based on geographic location, with only I/O devices that are properly operable in the current location being turned on. In some embodiments, the geographic position data acquired by the data collection device may indicate the type of communication network environment in which the data collection device is located, so that a selected I/O device may be operates based on the network environment. For example, a wireless communication device such as an IEEE 802.11 communication device may be activated upon detecting that the data collection device is in a location that is served by an appropriate wireless local area network (LAN). Similarly, a wireless communication device may be turned off upon detecting that the data collection device is in a location where there are no appropriate access points available for communication. In some embodiments, particular security credentials are identified and provided based on the location of the data collection device, so that the data collection device can access the communication network that services the device's current location. These security credentials may include a password or passphrase, a certificate, a shared key, or other security measures.

I/O devices may also be turned on and off based on whether the data collection device is located in the United States of in Europe, for example, so that only devices operable in the current geographic region are turned on. In addition, the power level of I/O devices can be adjusted based on the type of environment identified, to best match the performance of the I/O device to the requirements dictated by the current environment in which the data collection device is located.

I/O devices may also be configured to operate in a particular manner according to their geographic location, such as by selecting a particular wireless communication mode, which may involve selection of one or more of a protocol or modulation scheme (e.g., orthogonal frequency division multiplexing (OFDM), complementary code keying (CCK), binary phase shift keying (BPSK), and others). For example, a wireless communication device may be configured to communicate according to a particular communication protocol upon detecting that the data collection device is in a location where access points are present that communicate according to that protocol.

There are several examples of scenarios where the automatic configuration and power state control of I/O devices provided by the present invention is useful.

Example 1

A user with a data collection device in a vehicle drives to an area that has an active wireless network. The data collection device stores in its internal memory a map of the locations of many networks of this type. The data collection device gathers current position data and compares it to the stored network map. Because the wireless network is known to exist at the location where the data collection device is present, the device automatically turns on its local area wireless network interface and attaches to the network to gather and deliver data. The data collection device also turns off its high power consumption wide area network interface, thus conserving battery power and reducing operating costs by using the less expensive local area wireless network.

Example 2

A user with a data collection device working in a large building scans a barcode or an RFID tag as the user enters a given region of the building. The data collection device detects that the barcode or RFID tag contains position data and determines that when the user is in this region, a request must be made to a central server for a certain type of user task instruction. Once the request is completed, the data collection device presents the user with a list of tasks to perform that is specific to this user and this region of the building.

Example 3

A data collection device receives position data from a wireless network access point. The position data indicates the position of the access point itself. The data collection device has a locally stored map that indicates an appropriate list of actions to take when particular position data is received. This list of actions may include uploading data at the end of the work day or requesting some work related information from a central server, for example.

The above-described geographic position-based configuration and control system allows a data collection device to be operated in a very efficient manner. I/O devices can be controlled so that they are only powered when their operation is necessary or appropriate, extending battery life and device run time. The I/O devices also are available for operation nearly instantly after entering an environment where they are needed. Mistakes by the user in configuring the I/O devices are eliminated by the provision of proper configuration commands to the devices based on gathered position data. The geographic position data may be gathered in several ways, including by a GPS receiver, a wireless communication device, a barcode scanner, or an RFID tag reader. In another embodiment, different types of information may be gathered in order to configure devices, such as by provision of instruction data that indicates tasks that a user needs to perform for a particular assignment.

There are several benefits to the present invention. Workers efficiency and accuracy is increased by the invention, as operation of peripherals or system/application software associated with a device can be at least partially automated based on geographic position data. For example, when a delivery person drives up to a store with a portable device, the delivery or pickup order may be automatically presented on the device via a database query receiving geographic position data as input. This eliminates the need for the user to enter the address or name of the store, saving time and reducing errors. Improved device functionality is also provided by the invention. For example, the display backlight of the device can be automatically turned on or off in areas that are known to have problematic lighting conditions, or the wireless transceiver of the device can be adjusted for optimal communication characteristics based on the communication environment of the particular location. Speaker volume can be turned up or down based on known location-specific ambient noise characteristics, or CPU speed can be adjusted up or down based on the type of computing task that is performed in a certain location. Security benefits are provided by the invention as well, as devices can configure and use a communication link to automatically send an alert to an administrative authority when they are taken outside their normal and acceptable usage boundaries, for example. Safety benefits are also provided in certain environments. For example, in a hospital setting, radio frequency devices need to be powered off in some areas of the hospital so as not to interfere with sensitive medical equipment. In an airport setting, RF devices can be automatically turned off when a worker walks into an area where such devices are prohibited, to avoid interference with cockpit to tower communications. Other potential benefits of the invention will be apparent to those skilled in the art.

Although the present invention has been described with reference to preferred embodiments, workers skilled in the art will recognize that changes may be made in form and detail without departing from the spirit and scope of the invention.

What is claimed is:

1. A computing device comprising:
   a plurality of input/output devices;
   a position data detection device operable to communicate with a geographic position data source to acquire environment identification data; and
   a device management program that receives the acquired environment identification data and configures the computing device to operate a selected one of the plurality of input/output devices based on the acquired environment identification data;

wherein the acquired environment identification data indicates the type of communication network environment in which the computing device is located, and further indicates security credentials required to access the communication network.

2. The computing device of claim 1, wherein the acquired environment identification data indicates the geographic region in which the computing device is located.

3. The computing device of claim 1, wherein the device management program instructs the selected one of the plurality of input/output devices to communicate according to a particular communication mode based on the acquired environment identification data.

4. The computing device of claim 1, wherein the device management program acquires policy information from a geographic position database from which a determination of appropriate commands to be performed on the input/output device is made, the policy information being based on a comparison between the acquired environment identification data and position information stored in the geographic position database.

5. The computing device of claim 4, wherein the geographic position database is stored in a memory of the computing device.

6. The computing device of claim 4, wherein the geographic position database is stored remotely from the computing device, and wherein the input/output device is operable under the control of the device management program to retrieve information stored in the geographic position database.

7. The computing device of claim 1, further comprising system/application software in communication with the device management program, the system/application software performing actions that are driven by the acquired environment identification data.

8. A method of configuring a computing device that includes a plurality of input/output devices, the method comprising:

acquiring data representing a geographic position of the computing device;

configuring the computing device to operate a selected one of the plurality of input/output devices based on the acquired data representing the geographic position of the computing device;

wherein the data representing the geographic position of the computing device is analyzed to identify an environment in which the computing device is located;

wherein the environment identified is an indicator of the type of communication network in which the computing device is located; and wherein the indicator of the type of communication network in which the computing device is located includes an indication of security credentials required to access the communication network.

9. The method of claim 8, wherein configuring the computing device to operate a selected one of the plurality of input/output devices comprises instructing the selected input/output device to communicate according to a particular communication mode based on the data representing the geographic position of the computing device.

10. The method of claim 8, further comprising:

acquiring policy information from a geographic position database from which a determination of appropriate commands to be performed on the input/output device is made, the policy information being based on a comparison between the data representing the geographic position of the computing device and position information stored in the geographic position database.

11. The method of claim 10, wherein acquiring the appropriate commands to be performed on the input/output device from the geographic position database comprises performing a local query /response protocol to acquire the commands from a memory of the computing device.

12. The method of claim 10, wherein acquiring the appropriate commands to be performed on the input/output device from the geographic position database comprises operating a transceiving input/output device to perform a remote query/response protocol to acquire the commands from a memory located remotely from the computing device.

13. The method of claim 1, further comprising:

performing system/application functions driven by the data representing the geographic position of the computing device.

* * * * *